United States Patent Office 3,016,360
Patented Jan. 9, 1962

3,016,360
CONDENSATION ELASTOMERS CONTAINING FLUORINE
George C. Schweiker, Niagara Falls, and Paul Robitschek, Wilson, N.Y., assignors to Hooker Chemical Corporation, Niagara Falls, N.Y., a corporation of New York
No Drawing. Filed Mar. 19, 1957, Ser. No. 646,968
34 Claims. (Cl. 260—40)

This invention relates to fluorine-containing elastomers, and more particularly refers to elastomers formed from condensation products of polycarboxylic compounds with polyhydric alcohols.

The advent of modern high-speed, high-altitude aircraft has created a need for elastomers which will withstand the extreme conditions encountered. The first requirement is that the elastomer should show good resistance to hydrocarbon fuels, lubricants, hydraulic fluids, and aqueous salt and acid solutions. A second requirement is that the elastomer be able to withstand high temperatures for prolonged periods of time. Another requirement is that the elastomer retain its good flexibility even when subjected to very low temperatures such as are encountered at high altitudes, or in Arctic regions.

A number of elastomers have been developed in the past which have attempted to meet these conditions. Many of these elastomers have exhibited several of the required properties but none has exhibited them all. For example, solvent-resistant addition polymers have been made by copolymerization with highly polar monomers, but these materials have lacked good low temperature flexibility. Organic polysulfide elastomers have been made with have good resistance to fuels and retain good low temperature flexibility. However, they have poor heat resistance. Fluorinated alkyl acrylates and other addition type fluorinated polymers and copolymers, such as copolymers of vinylidene fluoride with chlorotrifluoroethylene or perfluoropropene have been developed, some of which show excellent solvent resistance to most non-fluorinated solvents, and some of which additionally are serviceable at high temperatures in air. However, low temperature flexibility of these materials is poor. Various diisocyanate modified hydrocarbon polyesters have been developed which exhibit high tensile strength, high tear resistance, high abrasion resistance, good elasticity, good solvent resistance and good oxidation stability. However, their high temperature stability is not good. Some attempts additionally have been made to produce an elastomer from polyester produced by reacting fluorine containing carboxylic acids with diols. However, none of the attempts have been successful in achieving a polyester which has sufficiently high molecular weight from which an elastomer could be made.

It is an object of the present invention to provide an elastomer which has high resistance to the solvent action of hydrocarbon fuels, lubricating oils, hydraulic fluids, and aqueous salt and acid solutions. It is also an object to provide an elastomer which exhibits excellent resistance to high temperatures. It is additionally an object of this invention to provide an elastomer which has high flexibility at low temperatures. It is still further an object of this invention to provide an elastomer which has high tensile strength and other physical properties generally desired of a high-grade elastomer. It is still a further object to provide an elastomer which may be formulated and compounded on existing types of equipment generally used in the rubber industry. It is a further object of this invention to provide a method for producing high molecular weight linear polyesters from fluorine-containing diols which may be subsequently cured to form elastomers. It is still further an object to provide methods for cross-linking and for compounding the high molecular weight linear polyesters formed to produce elastomers having the properties above-described. Another object is the preparation of novel linear polyesters which are used in order to produce the elastomers having the properties above-described. Further objects of the present invention will become apparent from the following description and examples.

It has now been found that an elastomer having high resistance to hydrocarbon fuels, lubricants, hydraulic fluids, aqueous salt and acid solutions, excellent high temperature resistance, excellent flexibility at low temperatures, and which exhibits generally good mechanical properties may be produced by condensing a polycarboxylic compound with a fluorine-containing diol having the general formula:

$$HOCH_2-C_nF_{2n}-CH_2OH$$

where $n$ is an integer, preferably between one and four, to produce a polyester having a number average molecular weight in excess of 3,000, and subsequently cross-linking and compounding the polyester so produced with suitable cross-linking and compounding agents.

More highly fluorinated diols of this general formula i.e. where $n$ exceeds 4 may also conveniently be used in this invention, but such compounds are less readily available at the present time than the preferred diols.

The elastomers thus produced have been found extremely useful for application in aircraft and other vehicles where elastomers having good hydrocarbon fuel, lubricant, hydraulic fluid and aqueous acid and salt solution resistance, together with high temperature resistance and low temperature flexibility are needed for such applications as gas tank sealants, O-rings, fuel conduits, etc.

The linear polyester is first prepared by condensing the polycarboxylic compound with the fluorine-containing diol. The polycarboxylic compound can be used as either the diacid, anhydride, diester, or the diacid chloride. However, it has been found in practice that the use of the diacid chloride greatly facilitates the esterification reaction. Esterification is carried out until the linear polyester has a number average molecular weight as determined from viscosity of at least 3,000, and preferably greater than 7,000. The process is generally carried out in an inert atmosphere such as nitrogen, especially when at higher temperatures, and the temperatures used may be from below room temperature at the start of the reaction to 250 degrees centigrade or over at the end of the reaction, depending upon the nature of the reactants and the products. After the desired molecular weight has been reached, the linear polyester is reacted with a cross-linking agent to produce the elastomer.

The cross-linking may be accomplished by one of several methods. First the linear polyester may be cross-linked by reacting it with a free radical polymerization catalyst such as peroxides, typified by dicumyl peroxide, benzoyl peroxide, tert-butyl peroxide, chlorobenzoic peroxides. It is believed that the free radical formed attacks the active hydrogen in the chain and sets up a bond between one chain and another. The linear polyesters may also be extended and cross-linked by reaction with polyisocyanates, for instance with a diisocyanate such as methylene bis(4-phenyl-isocyanate). Alternatively, a small amount of an unsaturated acid such as maleic, fumaric, itaconic, and bis($\alpha,\omega$-methylene hydrocarbon dicarboxylic acid can be included in the linear polyester during the esterification, and the linear polyester subsequently cross-linked either with or without a copolymerizable monomer containing a carbon-to-carbon double bond such as styrene, divinyl benzene, vinyl pyridine, acrylates, vinyl acetate, etc. in the presence of a free-radical polymerization catalyst such as dicumyl peroxide, benzoyl peroxide, tert-butyl peroxide, chlorobenzoic peroxides. In another method the terminal hydroxyl groups of the linear chains may be extended and cross-linked by reaction with polyepoxides in the presence or absence of catalysts such as amines, diamines or dicarboxylic acids, or by polyketenes, polyacid chlorides, anhydrides and polyanhydrides.

The preferred epoxy resins are the phenyl glycidyl ether reaction products of bisphenol and epichlorhydrin.

In order to impart certain desired properties, various fillers, reinforcing agents, antioxidants, softeners and extenders traditionally used in the rubber art may be incorporated in the elastomer of the present invention. Among these are the various carbon blacks, mineral fillers, and special additives.

The following examples serve to illustrate various methods of practicing the present invention.

The examples immediately following demonstrate methods for the preparation of the various starting materials used to produce the linear polyesters of the present invention.

EXAMPLE 1

2,2,3,3,4,4-hexafluoropentanediol was prepared in the following manner. First perfluoroglutaric acid was prepared by the aqueous permanganate oxidation of 1,2-dichlorohexafluorocyclopentene according to the method described by E. McBee, P. Wiseman and G. Bachmann, Ind. Eng. Chem., 39, 415 (1947). The white crystalline material was purified by vacuum distillation. The acid thus prepared was then refluxed as a mixture with 100 percent excess ethanol and a small amount of sodium bisulfate in benzene. After the water had been azeotroped off and the benzene removed, the crude ester was washed with 5 percent sodium carbonate in water, then dried and distilled. The colorless diethyl perfluoroglutarate thus obtained was then reduced with lithium aluminum hydride according to the method reported by E. McBee, W. Marzluff, and O. Pierce, J. Am. Chem. Soc., 74, 444 (1952). The white crystalline 2,2,3,3,4,4-hexafluoropentanediol thus obtained had a melting point of 78.5 degrees to 79.5 degrees centigrade and a mole purity of 99.8 mole percent as determined from cryoscopic measurements, after recrystallization.

EXAMPLE 2

2,2,3,3,4,4,5,5-octafluorohexanediol was prepared as follows: First, 1,2-dichlorooctafluorocyclohexene was prepared from hexachlorobenzene and antimony pentafluoride in a manner similar to that disclosed by E. McBee, P. Wiseman and G. Bachmann, Ind. Eng. Chem., 39, 415 (1947), by adding antimony pentafluoride gradually to a slurry of the hexachlorobenzene in mixed chloro-fluoro-antimony salts maintained at 125 degrees to 135 degrees centigrade. After the reaction had subsided, distillation gave a crude product which was washed with 17 percent hydrochloric acid, 10 percent potassium hydroxide and water and then dried. Fractional distillation gave 40 percent yields as colorless 1,2-dichlorooctafluorocyclohexene having a boiling point of 112 degrees to 114 degrees centigrade at 750 millimeters. The compound thus formed was then oxidized with aqueous permanganate solution according to the method described by E. McBee, P. Wiseman and G. Bachman in the same reference cited above, to produce white crystalline perfluoroadipic acid dihydrate after recrystallization from ethylene dichloride. The material had a melting point of 68 to 68.5 degrees centigrade. The compound thus formed was esterified in the same manner used for the preparation of diethyl perfluoroglutarate. Fractional distillation under reduced pressure gave an 88 percent yield of colorless diethyl perfluoroadipate, having a boiling point of 50 degrees centigrade at 0.5 millimeter. This material was then reduced with lithium aluminum hydride according to the method described by E. McBee, W. Marzluff, and O. Pierce, J. Am. Chem. Soc., 74, 444 (1952). After four crystallizations from benzene a yield of 91 percent white crystalline 2,2,3,3,4,4,5,5-octafluorohexanediol was obtained having a melting point of 67 to 68 degrees centigrade.

EXAMPLE 3

Glutaryl chloride was prepared by the action of phosphorus pentachloride on an equivalent amount of glutaric acid. A yield of 89 percent colorless glutaryl chloride was obtained from distillation of the reaction mixture. Redistillation gave a colorless product which had a boiling point of 106 to 106.5 degrees centigrade at 13 millimeters.

EXAMPLE 4

Adipyl chloride was prepared from 50 percent excess thionyl chloride and adipic acid. The reaction product was distilled to give a colorless product having a boiling point of 124 degrees centigrade at 13 millimeters.

Suberyl and azelayl chlorides were prepared from equivalent amounts of the corresponding acids in the above manner. Suberyl chloride boiled at 122 to 123 degrees centigrade at 2.9 millimeters, and azelayl chloride boiled at 124 to 127 degrees centigrade at 2.2 to 2.5 millimeters.

EXAMPLE 5

A reaction tube having a 40 cc. capacity was fitted with a gas inlet tube extending to the bottom of the reaction tube, and an outlet was provided which could be attached to either a vacuum source or left open to the atmosphere. The apparatus was placed in an oil bath whose temperature was controlled by a Fenwall thermo-switch. Into the reaction tube were placed 17.45 grams of 2,2,3,3,4,4-hexafluoropentanediol and 15.06 grams of adipyl chloride (equimolar quantities) and were heated slightly. Nitrogen which had been purified by alkaline pyrogallol followed by concentrated sulfuric acid was passed through the reaction mixture during the heating period. A vigorous reaction ensued characterized by the strong evolution of hydrogen chloride. After the reaction had somewhat subsided, the temperature of the mixture was gradually increased over a period of about eight hours until a temperature of about 200 degrees centigrade was attained. Purified nitrogen was passed through the reaction mixture at a slow rate during that period. After the temperature was maintained at 200 degrees centigrade for a short time, a vacuum was applied intermittently for 15 to 30 minutes in order to facilitate the removal of trapped bubbles. The resulting linear polyester had a viscosity of 8,330 poises at 110 degrees centigrade, and a number average molecular weight determined from the viscosity measurement of 15,700.

The following example illustrates another novel method of condensing a polycarboxylic compound with a fluorine-containing diol in order to obtain linear polyester resins having a higher number average molecular weight than is conveniently obtainable by the method disclosed in Example 5 above.

EXAMPLE 6

Using the apparatus and procedure of Example 5, fifteen grams of adipyl chloride, 17.5 grams of 2,2,3,3,4,4-hexafluoropentanediol, and 5 grams of dichlorobenzene were charged into the reaction tube. The mixture was heated slightly to initiate a vigorous reaction characterized by the strong evolution of hydrogen chloride. The temperature of the mixture was gradually increased over a period of eight hours until a temperature of about 200 degrees centigrade was attained, while purified nitrogen was continually passed through the reaction mixture. After maintaining the reaction mixture at this temperature for a short time, a vacuum was supplied intermittently for 15 to 30 minutes to remove the trapped gas bubbles. The resulting linear polyester had a number average molecular weight of about 24,000.

Other compounds may be used in place of dichlorobenzene, among which are the various isomers of liquid chlorobenzenes and dichlorohexafluoroxylene. The general requirements of these compounds are that they must be inert to the reactants, stable at the reaction temperatures employed, and removable in a simple manner and at a suitable temperature, such as by vacuum distillation. This temperature must of course be lower than that which would cause thermal degradation of the polyester. In addition the reactants and the polyester should be soluble in the compound at the reaction temperatures employed.

EXAMPLE 7

Using the apparatus described in Example 5, equimolar quantities of adipic acid and 2,2,3,3,4,4-hexafluoropentanediol, and 0.01 percent zinc chloride were charged to the reaction flask and reacted to a temperature of 215 degrees centigrade in a nitrogen atmosphere. Reaction was maintained for 240 hours. At the end of that period a linear polyester was obtained in a form of a viscous brown liquid having a number average molecular weight of 9,000.

When using linear polyesters having low or moderate molecular weight, it is sometimes desirable to extend their chain length prior to the cross-linking process. This may be done by reacting the linear polyesters with diisocyanates or with a mixture of a diisocyanate and a small amount of an amine such as quinoline at a temperature from about 130 to 160 degrees centigrade. Diamines may also be used such as phenylenediamine. The diisocyanate reacts with the terminal hydroxyl groups and effects a chain extension. The resulting polyester becomes transformed into a tough, rubber-like gum suitable for milling and subsequent cross-linking. Chain extension may also be accomplished by reaction with diepoxides, polyepoxides, diketenes, diacid chlorides, anhydrides, and dianhydrides, etc. Of the diisocyanates, those containing aromatic rings are most suitable. Among the most common are methylene bis(4-phenylisocyanate), 2,4-toluene diisocyanate, 2,6-tolylene diisocyanate, and mixtures thereof. Methylene bis(4-phenylisocyanate) is preferred.

EXAMPLE 8

One mole of a linear polyester such as produced above in Example 7, 1.10 moles of methylene bis(4-phenylisocyanate), and 0.10 mole of hexamethylene diamine were mixed together at 120 degrees to 130 degrees centigrade for about 20 minutes. The reaction mixture was then transferred to a greased tray and heated at 130 to 160 degrees centigrade overnight in an oven. As a result of this chain extension process, the former viscous liquid polyester having a number average molecular weight of about 9,000 was transformed into a tough, rubber-like gum having a number average molecular weight in excess of 15,000 and which was suitable for milling with a cross-linking agent to produce a vulcanized elastomer.

The following example demonstrates the method of increasing the molecular weight of a relatively low number average molecular weight linear polyester by the method of chain extension with an epoxy resin.

EXAMPLE 9

A hexafluoropentylene adipate linear polyester having a number average molecular weight of 7,300 which was prepared by reacting equimolar portions of 2,2,3,3,4,4-hexafluoropentanediol with adipyl chloride according to the method disclosed in Example 5, was mixed with an epoxy resin comprising the reaction product of bisphenol A and epichlorhydrin and catalysed with 5 percent quinoline. After heating for 10 hours at 160 degrees centigrade, the viscosity of the resin increased considerably, indicating increase in the molecular weight.

The following example illustrates the preparation of a linear polyester of the present invention where the polycarboxylic compound used was in the form of a diester.

EXAMPLE 10

Equimolar portions of 2,2,3,3,4,4-hexafluoropentanediol and the diethyl ester of 3,6-dithia-octanedioic acid and lithium hydride catalyst were reacted at a temperature of 150 degrees centigrade. After reaction for several hundred hours, a small amount of a moderately high molecular weight linear polyester resulted.

Anhydrides of the dicarboxylic acids may also be used to produce the polyesters of the present invention, but their use is not as desirable as that of the acid chlorides.

The linear polyesters as formed above may be cross-linked by any of the methods described below to produce fluorine-containing elastomers.

The examples in Table I below show the preparation of various linear polyesters of the present invention by the method of Example 5 using various dicarboxylic chlorides and various fluorine-containing diols. A 1:1 molar ratio of diol to diacid chloride was used in every case. Where two diacid chlorides were utilized, the mole percent of each of the total acid chloride content was given. The length of the reaction time is given in hours and was measured from the start of heating above room temperature to the time when the apparatus was removed from the heating bath at 200 degrees centigrade. Viscosity ($\eta$) was measured at 110 degrees centigrade except where indicated and was obtained by applying the methods described by P. Flory, J. Am. Chem. Soc., 62, 1057 (1940) for hydrocarbon polyesters. The number average molecular weight, $M_n$ was determined also from Flory's equations using constants obtained from a linear polyester comprised of adipic acid and 2,2,3,3,4,4-hexafluoropentanediol.

*Table I*

POLYESTERS FROM DICARBOXYLIC ACID CHLORIDES AND FLUORINE-CONTAINING DIOLS

| Ex. No. | Starting Materials | Reaction time (hrs.) | $\eta$ (at 110° C) | $M_n$ | Properties |
|---|---|---|---|---|---|
| 11 | Glutaryl chloride 2,2,3,3,4,4-hexafluoropentanediol | 12 | 60.7 | 6,020 | Waxy solid; M.P. 39°–42° C.; brittle ~ −50° C. |
| 12 | Glutaryl chloride 2,2,3,3,4,4,5,5-octafluorohexanediol | 13 | 17.2 | 6,600 | Waxy solid; M.P. ~40° C.; brittle ~ −50° C. |
| 13 | Adipyl chloride 2,2,3,3,4,4-hexafluoropentanediol | 9 | [1] 1,370 | 17,400 | Clear; rubberlike; brittle below ~ −60° C.; crystallized very slowly; M.P. ~30° C. |
| 14 | ....do.... | 10 | 7,400 | 15,430 | |
| 15 | ....do.... | 7 | 8,400 | 15,740 | |
| 16 | Adipyl chloride 2,2,3,3,4,4,5,5-octafluorohexanediol | 5 | [1] 1,200 | 18,300 | White, waxy solid; M.P. ~67° C. |
| 17 | 95% adipyl chloride, 5% fumaryl chloride 2,2,3,3,4,4-hexafluoropentanediol | 11 | 97 | 6,590 | |
| 18 | 90% adipyl chloride, 10% fumaryl chloride 2,2,3,3,4,4-hexafluoropentanediol | 11 | 60 | 5,840 | Brittle ~ −55° C. |
| 19 | 85% adipyl chloride, 15% fumaryl chloride 2,2,3,3,4,4,5,5-octafluorohexanediol | 12 | 133 | 7,100 | |

[1] At 205° C.

Table II below gives other examples of linear polyesters prepared from various combinations of diacid chlorides and fluorine-containing diols. The method of condensation described in Example 6 was used in these examples. The various diacid chlorides and diol starting materials are given. The properties of the linear polyesters were obtained in a similar manner to those of Table I.

Table II
POLYESTERS FROM DICARBOXYLIC ACID CHLORIDES AND FLUORINE-CONTAINING DIOLS

| Example No. | Starting materials | Melt viscosity ($\eta$) poises ° C. | Number average mol. wt. ($M_n$) | Approx. brittle temp. (° C) | Approx M.P. (° C) |
|---|---|---|---|---|---|
| 20 | Glutaryl chloride 2,2,3,3,4,4-hexafluoropentanediol | 191 (100°) | 7,930 | −50° to −55° | 40 |
| 21 | Glutaryl chloride 2,2,3,3,4,4,5,5-octafluorohexanediol | 239 (110°) | 8,950 | −50° to −55° | 40 |
| 22 | Adipyl chloride 2,2,3,3,4,4-hexafluoropentanediol | 23,000 (250°) | 25,000 | −65° | 30 |
| 23 | Adipyl chloride 2,2,3,3,4,4,5,5-octafluorohexanediol | 6,380 (215°) | 24,000 | | 60–70 |
| 24 | Suberyl chloride 2,2,3,3,4,4-hexafluoropentanediol | 225 (110°) | 7,480 | −75° | 20–26 |
| 25 | Suberyl chloride 2,2,3,3,4,4,5,5-octafluorohexanediol | 340 (110°) | 8,800 | | 58–61 |
| 26 | Azelayl chloride 2,2,3,3,4,4-hexafluoropentanediol | 2,790 (110°) | 12,000 | −48° to −65° | 30 |
| 27 | Azelayl chloride 2,2,3,3,4,4,5,5-octafluorohexanediol | 3,440 (110°) | 13,300 | | 47–50 |
| 28 | Sebacyl chloride 2,2,3,3,4,4-hexafluoropentanediol | 1,900 (110°) | 11,000 | Below −65° | 30 |
| 29 | Sebacyl chloride 2,2,3,3,4,4,5,5-octafluorohexanediol | 115 (110°) | 6,580 | | 55–60 |

Various other fluorine-containing diols falling within the general formula claimed may be used, among them being 2,2-difluoropropanediol and 2,2,3,3,-tetrafluorobutanediol. When the total amount of fluorine constitutes a lower proportion of the weight of the polyester, however, the elastomer loses some of its desirable properties.

The polycarboxylic compound may also vary considerably, however, of these, we prefer to employ the dicarboxylics. Although the acid chlorides have been found most useful in most cases, the acids, anhydrides, and esters may be used. Among the polycarboxylic compounds which may be employed are those having structures such as

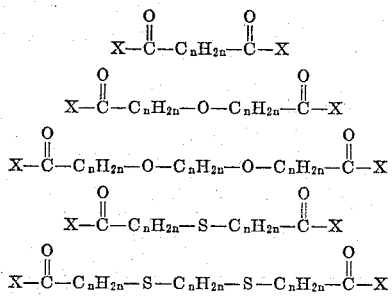

wherein X may be OH, chloro-, anhydro-, OR where R is an alkyl group and wherein $n$ is an integer between 0 to 10. When the polycarboxylic compound is in the anhydride form, the two X's represent a single anhydro-radical. Among the specific compounds within this definition are oxalic, malonic, succinic, glutaric, adipic, pimelic, suberic, azelaic, isosebacic, sebacic, diglycolic, thiodiglycolic, 3,5-dioxaheptanedioic, 3,5-dithiaheptanedioic, 3,6-dioxaoctanedioic, 3,6-dithiaoctanedioic, 4-oxapimelic, 4-thiapimelic, 3-oxaadipic, 3-thiaadipic, dithiodiacetic, etc. Longer chain polycarboxylic compounds may be used, but since the fluorine content of the polyester decreases thereby, some of the desired properties are minimized.

Tables III and IV below contain examples illustrating the effects upon the linear polyester of varying the acid/diol ratio in either direction from unity. Table III shows the effect of increasing the mole ratio of diol to diacid chloride. The data show that increasing the ratio results in decreasing the number average molecular weight and also the viscosity. Table IV shows that increasing the mole ratio of diacid chloride to diol also tends to decrease the number average molecular weight and the viscosity. Since a linear polyester having a high number average molecular weight and a high viscosity, upon cross-linking results in a superior elastomer, the optimum ratio would appear to be in the vicinity of unity. However, as the results in the tables indicate, satisfactory polyester resins can be made by using ratios within the range of diacid chloride/diol of 1.030 to diol/diacid chloride of 1.110, or, in terms solely of diacid chloride to diol of about .900 to about 1.030. It was observed that as the mole ratio of diacid chloride to diol is increased, the resulting polyester becomes increasingly darker. It is believed that this results from a deleterious side reaction occurring at the higher ratios.

The molecular weight and viscosity of the polyester can thus be controlled by controlling the mole ratio of diol/diacid chloride. When an excess of diol is used, the chain endings are primarily hydroxyl groups, which is beneficial for certain extension and cross-linkage reactions.

Another method of controlling molecular weights which may be used is to add a chain stopper in minor proportion in order to terminate the growth of the polyester chain, or to reduce the number of free carboxyl or hydroxyl groups, or to introduce a hydrocarbon or fluorocarbon terminal residue. Among the compounds which may be used as chain stoppers are a wide variety of monohydric alcohols, such as butyl, hexyl, octyl, dodecyl, benzyl, etc., or partially fluorinated alcohols such as 1,1-dihydroperfluoroalkyl alcohols or monobasic acids or acid chlorides such as acetic, propionic, butyric, ethylhexoic, benzoic, etc.

In each example of Tables III and IV the starting materials were adipyl chloride and 2,2,3,3,4,4-hexafluoropentanediol. The viscosity at 110 degrees centigrade and $M_n$ were obtained as in the examples above.

Table III
INCREASING MOLE RATIO OF FLUORINE-CONTAINING DIOL TO DIACID CHLORIDE

| Ex. No. | Starting materials | Mole ratio of diol to acid chloride | Reaction time (hrs.) | $\eta$ (at 110° C.) | $M_n$ |
|---|---|---|---|---|---|
| 30 | Adipyl chloride 2,2,3,3,4,4-hexafluoropentanediol | 1.005 | 7 | 2,440 | 12,800 |
| 31 | ----do---- | 1.010 | 6 | 832 | 10,480 |
| 32 | ----do---- | 1.014 | 12 | 219 | 7,940 |
| 33 | ----do---- | 1.017 | 6 | 152 | 7,300 |
| 34 | ----do---- | 1.020 | 6 | 128 | 7,030 |
| 35 | ----do---- | 1.030 | 6 | 67.8 | 6,000 |
| 36 | ----do---- | 1.040 | 6 | 40.0 | 5,210 |
| 37 | ----do---- | 1.050 | 5 | 21.3 | 4,350 |
| 38 | ----do---- | 1.110 | 5 | 5.7 | 2,790 |

Table IV
INCREASING MOLE RATIO OF DIACID CHLORIDE TO FLUORINE-CONTAINING DIOL

| Ex. No. | Starting materials | Mole ratio of acid chloride to diol | Reaction time (hrs.) | $\eta$ (at 173° C.) | $M_n$ |
|---|---|---|---|---|---|
| 39 | Adipyl chloride 2,2,3,3,4,4-hexafluoropentanediol | 1.005 | 7 | 1,655 | 16,100 |
| 40 | ----do---- | 1.010 | 7 | 680 | 13,900 |
| 41 | ----do---- | 1.015 | 7 | 530 | 13,300 |
| 42 | ----do---- | 1.020 | 7 | 300 | 12,050 |
| 43 | ----do---- | 1.025 | 7 | 147 | 10,600 |
| 44 | ----do---- | 1.030 | 9 | [1] 400 | 9,040 |

[1] At 110° C.

In order to produce a vulcanized elastomer, the linear polyesters produced in the examples above must be cross-linked with a suitable cross-linking agent. Among those that are most useful are the peroxide free-radical catalysts such as dicumyl peroxide (either as such or as Di-Cup 40C, which is dicumyl peroxide contained on a calcium carbonate base, manufactured by Hercules Powder Company), benzoyl peroxide, tert-butyl peroxide, chloro-benzoic peroxides, etc. Where the polyester has been chain extended by a diisocyanate, either peroxides or polyisocyanates may be used. Suitable diisocyanates are methylene bis(4-phenylisocyanate), 2,4-tolylene diisocyanate, 2,6-tolylene diisocyanate.

In order to promote the cross-linking step, a dicarboxylic compound containing aliphatic carbon-to-carbon unsaturation may be incorporated during the esterification of the linear polyester in relatively small amounts up to 30 mole percent based on the acids used. Among such compounds are fumaryl acid or chloride, itaconic acid, anhydride, or acid chloride, bis-($\alpha,\omega$-methylene) hydrocarbon dicarboxylic acids or acid chlorides, maleic acid, and maleic anhydride. The linear polyester containing unsaturation may then be cross-linked by peroxide catalysts such as dicumyl peroxide, etc. Additionally, a copolymerizable monomer containing aliphatic carbon-to-carbon unsaturation such as styrene, vinyl pyridine, divinyl benzene, acrylates, vinyl acetate, etc., may be added to this unsaturated linear polyester in amounts ranging from 1 to 100 percent by weight, based on the polyester, in order to form bridges between the linear chains.

The following example demonstrates the use of diisocyanates both for chain extension and for cross-linking the hexafluoropentylene adipate linear polyester.

EXAMPLE 45

One mole of hexafluoropentylene adipate, prepared by the method disclosed in Example 5, and having a molecular weight ($M_n$) of 6,840 was reacted with one mole of methylene bis (4-phenylisocyanate). The reactants were mixed together at 120 degrees to 130 degrees centigrade for about 15 to 30 minutes, and then transferred into a waxed tray and heated to 130 to 160 degrees overnight in an oven. This treatment transformed the lower molecular weight liquid resin into a tough rubber-like gum suitable for milling. This material was then mixed with 0.5 mole additional methylene bis (4-phenylisocyanate) and one percent quinoline. After milling together the mixture was molded at 150 degrees centigrade for 90 minutes. The elastomer thus formed had a tensile strength of 634 lbs. per square inch at an elongation of 360 percent. In order to test its ability to withstand effects of contact with hydrocarbon fuels, a sample was left in a mixture of 70 percent isooctane and 30 percent toluene for seven days. At the end of that time, the elastomer still had a tensile strength of 350 lbs. per square inch at 360 percent elongation.

Table V below shows examples in which hexafluoropenylene adipate linear polyesters having various molecular weights and prepared by the method of Example 5 were subsequently cross-linked with the indicated amounts of Di-Cup 40C, a dicumyl peroxide catalyst absorbed on calcium carbonate and manufactured by Hercules Powder Company. The polyester and the peroxide were milled together, and after milling placed in a stainless steel mold at 165 degrees centigrade for 60 minutes. The particular curing temperatures and times used are dependent on a variety of factors including the type and viscosity of the polyester gum, the type and amount of curing agent, the type and amount of other compounding agents, etc. The curing temperature and time may thus be varied widely without departure from the scope of this invention. In addition to curing in the mold under pressure, curing or post curing after the initial mold cure, may be employed at elevated temperatures in an oven for various lengths of time. After curing, dumbbell specimens were cut from the moldings and tested on a Scott Tester, Model L-6 for tensile strength and elongation.

The data obtained shows that the tensile strength of gum vulcanizates of hexafluoropentylene adipate increases with increasing molecular weight ($M_n$) of the linear polyester resin. At the lowest $M_n$ used (12,200), 8 percent Di-Cup 40C, representing 3.2 percent active dicumyl peroxide appeared to represent the optimum amount of curing agent, giving a tensile strength of 250 lbs. per square inch. As $M_n$ of the linear polyester increased, the amount of curing agent for optimum tensile strength decreased very slightly, and the tensile strength increased markedly. At an $M_n$ of 17,100 a tensile strength of 800 lbs. per square inch was achieved with 6 percent and with 7 percent Di-Cup 40C.

Table V

CROSS-LINKING OF HEXAFLUOROPENTLYENE ADIPATE

| Example No. | $M_n$ | Di-Cup 40C percent | Tensile strength (p.s.i.) | Elongation (percent) | Hardness (Shore A) |
| --- | --- | --- | --- | --- | --- |
| 46 | 12,200 | 6 | 80 | 700 | 35-40 |
| 47 | 12,200 | 7 | 87 | 600 | 40-45 |
| 48 | 12,200 | 8 | 250 | 675 | 40-45 |
| 49 | 12,200 | 9 | 160 | 425 | 40-45 |
| 50 | 12,200 | 10 | 74 | 175 | 40-45 |
| 51 | 12,300 | 7 | 260 | 620 | 40-45 |
| 52 | 13,200 | 8 | 420 | 600 | 40-45 |
| 53 | 15,000 | 6 | 650 | 700 | 47-52 |
| 54 | 17,100 | 6 | 800 | 560 | 48-53 |
| 55 | 17,100 | 7 | 800 | 525 | 50-55 |
| 56 | 17,100 | 8 | 600 | 500 | 45-50 |
| 57 | 25,000 | 7 | 1670 | 500 | 50-55 |

In order to achieve the optimum tensile strength, tear resistance, and other desirable physical properties, a reinforcing filler commonly used in the rubber art is milled into the linear polyester prior to cross-linking. An effective filler is carbon black, either used alone or in combination with other fillers such as calcium carbonates, iron oxides, silicas, etc. The following example illustrates the preparation of the reinforced elastomer.

EXAMPLE 58

A linear polyester was first prepared by the method of Example 5. The gum had a number average molecular weight of 18,400. Twenty parts by weight Philblack O, a carbon black manufactured and sold by Phillips Petroleum Company and 11 parts by weight Di-Cup 40C were milled into the gum on a rubber mill. The mixture was heated for 50 minutes at 160 degrees centigrade whereby curing was accomplished.

Table VI below shows the effect of varying the amount of carbon black over a wide range. Even higher amounts of reinforcing agents may be used. The linear polyester used was the hexafluoropentylene adipate having a number average molecular weight of 17,100 and prepared generally by the method of Example 5 above. After the filler and Di-Cup 40C had been milled into the polyester, curing was effected by heating at 165 degrees centigrade for one hour. As can be seen from the results, the tensile strength increased greatly with additional amounts of carbon black, as well as did the modulus and hardness. Tensile strengths of 2,000 lbs. per square inch and higher were achieved through the utilization of 10 to 30 parts of carbon black.

Table VI

REINFORCING OF HEXAFLUOROPENTYLENE ADIPATE ($M_n$ 17,100)

Philblack O

| Percent reinforcing agent | 0 | 10 | 15 | 20 | 25 | 30 | 40 |
| --- | --- | --- | --- | --- | --- | --- | --- |
| Percent Di-Cup 40C | 7 | 7 | 7.5 | 8 | 8.5 | 9 | 10 |
| Tensile strength (p.s.i.) | 800 | 1,968 | 2,353 | 2,208 | 2,150 | 1,808 | 1,538 |
| Elongation (%) | 525 | 500 | 475 | 450 | 400 | 360 | 350 |
| Hardness (Shore A) | 50-55 | 55-60 | 57-62 | 56-60 | 56-61 | 60-65 | 63-68 |
| Brittle point (° F.) | All below −65° | | | | | | |

The amount of cross-linking agent such as the dicumyl peroxide may be varied over a wide range. However, after the optimum value is reached, there is no further advantage to additional amounts. Table VII below shows the effect of varying the amount of the cross-linking agent. The linear polyester was the same as used in Table VI above. Each formulation example contained 20 parts Philblack O and was cured as in Example 58.

*Table VII*

With 20 parts Philblack O

| Percent Di-Cup 40C | 7 | 8 | 9 | 10 | 11 | 12 |
|---|---|---|---|---|---|---|
| Tensile strength (p.s.i.) | 1,670 | 2,208 | 2,221 | 2,640 | 2,632 | 2,656 |
| Elongation (percent) | 425 | 450 | 430 | 375 | 325 | 310 |
| Hardness (Shore A) | 56–60 | 56–60 | 58–62 | 60–64 | 61–68 | 65–69 |

Table VIII shows the results obtained in tests for thermal stability of the elastomer at various temperatures for various periods of time. The elastomer used was comprised of a linear polyester of hexafluoropentylene adipate such as produced in Example 5 above, reinforced with 20 parts Philblack O, and cured with 11 parts Di-Cup 40C as described above in Table VII. The linear polyester had a molecular weight of 17,100. The mixture was cured for fifty minutes at 160 degrees centigrade. The results show that at 350 degrees and 400 degrees Fehrenheit, relatively small weight losses occur. The weight loss at 400 degrees Fahrenheit between 70 and 150 hours also was small. The weight loss at 500 degrees Fahrenheit for 24 hours was substantially higher. The results indicate that the elastomer is suitable for use in air at temperatures of up to 400 degrees for prolonged periods, and at 450 degrees Fahrenheit for less extended periods.

*Table VIII*

THERMAL STABILITY OF HEXAFLUOROPENTYLENE ADIPATE ELASTOMER

| Test temperature (° F) | 350 | 350 | 350 | 400 | 400 | 450 | 450 | 450 | 500 |
|---|---|---|---|---|---|---|---|---|---|
| Time (hours) | 24 | 168 | 257 | 70 | 150 | 24 | 70 | 150 | 24 |
| Weight loss (percent) | 1.58 | 2.62 | 3.04 | 4.5 | 6.3 | 5.4 | 12.3 | 23.8 | 17.7 |
| Tensile strength (p.s.i.) | | | 1265 | 720 | 640 | 341 | 320 | 385 | 80 |
| Elongation (percent) | | | 400 | 225 | 325 | 350 | 300 | 125 | 200 |
| 300% modulus (p.s.i.) | | | 750 | | | 262 | 320 | | |
| Set at break (percent) | | | 2–3 | 3–4 | 5–6 | 9 | 13 | 5–6 | 18–19 |
| Hardness (Shore A) | | | 63–67 | 62–65 | 62–64 | 60–63 | 63–65 | 68–72 | 52–55 |

The following table contains data showing the ability of the present elastomer to withstand aging in various liquids at room temperature. The elastomer was comprised of the same linear polymer of hexafluoropentylene adipate as used in Table VIII. The indicated amounts of Philblack O and Di-Cup 40C were added and the milled mixture cured according to the process of Example 58. Plexol 201 is a diester fluid used as a lubricating oil in aircraft. The elastomers before aging in the liquid had a tensile strength of about 2250 lbs. per square inch. The data show that tensile strength reduction was very low and weight loss was equally low. It is additionally shown that the elastomers are very resistant to 70/30 isooctane/toluene and to 10 percent solutions of hydrochloric acid and sodium chloride.

*Table IX*

| | Plexol 201 | 70/30: isooctane/toluene | 10% HCl | 10% NaCl |
|---|---|---|---|---|
| Parts Philblack O | 20 | 10 | 15 | 15 | 10 |
| Percent Di-Cup 40C | 8 | 7 | 7.5 | 7.5 | 7 |
| Hours in fluid | 168 | 72 | 168 | 168 | 168 |
| Weight change (percent) | −0.16 | +11.9 | +9.3 | −1.0 | −0.13 |
| Tensile Strength (p.s.i.) | 1,888 | 2,156 | 2,217 | 2,700 | 1,756 |
| Elongation (percent) | 425 | 510 | 475 | 500 | 500 |
| Hardness (Shore A) | 54–58 | 50–55 | 57–62 | 57–62 | 54–59 |

The following table shows the properties of the present elastomer with respect to aging at room temperature in Government designated JP-4 hydrocarbon jet fuel.

| Time (hrs.) | Weight gain (percent) | Tensile (p.s.i.) | Elongation (percent) | Hardness (Shore A) |
|---|---|---|---|---|
| 70 | 2.0 | 3,395 | 325 | 70–73 |
| 168 | 2.6 | 2,950 | 325 | 69–72 |

The linear polyester was hexafluoropentylene adipate having a number average molecular weight of 18,400 and compounded and cured with 20 parts Philblack O and 11 parts Di-Cup 40C (a mixture of 40% dicumyl peroxide on calcium carbonate). The cure as above was maintained for 50 minutes at 160 degrees centigrade.

The following table shows low temperature properties of the present elastomer which was compounded as above from the linear polyester having a number average molecular weight of 17,100, reinforced with 20 parts Philblack O and cured with 11 parts Di-Cup 40C for 50 minutes at 160 degrees centigrade. As seen in the table, the very low brittle temperature, as measured by ASTM D–746 test of minus 98 degrees Fahrenheit and the Gehman $T_{10}$ as measured by the Gehman torsional modulus test of minus 62 degrees Fahrenheit indicate that the potentiality of the elastomer for low temperature uses is excellent. In fact the low temperature characteristics of this elastomer are strikingly similar to those manifested by natural rubber.

Brittle temperature ASTM D–746 _____ ° F __ −98
Gehman $T_2$ _____ ° F __ −42
Gehman $T_5$ _____ ° F __ −56
Gehman $T_{10}$ _____ ° F __ −62
Gehman $T_{100}$ _____ ° F __ −72
Freeze point _____ ° F __ −71
Torsional modulus (G) at room temperature _____ p.s.i __ 188

Various common anti-oxidants may also be incorporated into the present elastomer, among which are neozone D (phenyl-beta-napththalamine marketed by Du Pont Co.), phenothiazine, permalux (the di-ortho-tolyl-guanidine salt of dicatechol borate, marketed by Du Pont Co.), Age Rite resin D (polymerized trimethyl dihydroquinoline, marketed by R. T. Vanderbilt Co.), and Age Rite white (symmetrical di-beta-naphthyl-para-phenylenediamine, marketed by R. T. Vanderbilt Co.).

Other reinforcing agents may also be used such as calcium carbonate, iron oxide, silicas, titanium dioxides, and diatomaceous earths. Generally, however, they are not as beneficial as the carbon blacks. In some cases, a combination of carbon black and carbonates may be beneficial. For example an elastomer prepared from hexafluoropentylene adipate having a molecular weight of 15,600 was mixed with 60 parts Philblack O and 15 parts Purecal U (calcium carbonate), and cured with 20–22 parts Di-Cup 40C. After aging for 168 hours in air at 400 degrees Fahrenheit, tensile strengths of up to 1400 pounds per square inch were still obtained. Immersion in Plexol 201, a diester lubricant, for 70 hours at 350 degrees Fahrenheit resulted in the elastomer's still retaining good tensile strength. The elastomer was even more resistant to a 70/30 mixture of isooctane and toluene where a tensile strength of 2217 lbs. per square inch was obtained after an exposure of 168 hours at room temperature, a loss of only 5.8 percent of the original tensile strength.

In addition to the linear copolymers formed by replacing various amounts of adipyl chloride by an unsaturated acid or acid chloride, e.g. fumaryl chloride, it is sometimes advantageous for certain purposes to use two or more dicarboxylic acid chlorides in the reaction with one or more of the fluorine-containing diols in accordance with this invention or one dicarboxylic acid chloride may be used with a mixture of two or more of the fluorine-containing diols. Certain combinations of dicarboxylic acids and fluorine-containing diols may be used for this purpose, which, if used alone, would not make a superior elastomer. For example such acids or acid chlorides as terephthalic, isophthalic, or some of the others, when used as the sole acid component in the reaction with 2,2,3,3,4,4,5,5-octafluorohexanediol, produce polyesters which are unsuitable as such for elastomers, but when a mixture of adipyl chloride with either of the above aromatic dicarboxylic acid chlorides is used with or without a small amount of unsaturated dicarboxylic acid chloride in reaction with the same or other fluorinated diol, a superior elastomer gum is formed. In a like manner, an infinite variety of copolymers may be prepared from the dicarboxylic acids or derivatives and the fluorinated diols in accordance with this invention by using one or more of the acids together with one or more of the diols in the reaction process, so long as the ratio of total diol concentration to total dicarboxylic acid chloride does not differ substantially from unity.

Two examples to illustrate this process are as follows:

EXAMPLE 59

A mixture containing 0.25 mole 2,2,3,3,4,4,5,5-octafluorohexanediol, and 0.75 mole 2,2,3,3,4,4-hexafluoropentanediol and 1.00 mole adipyl chloride was reacted as in Example 6 until the linear polyester had a number average molecular weight of about 20,800, as determined by melt viscosity measurements. When this gum was compounded with 60 parts Furnex (carbon black) and 15 parts Purecal U (calcium carbonate) and cured in the manner illustrated in Example 58 using 20 parts Di-Cup 40C (dicumyl peroxide on calcium carbonate), the vulcanized elastomer exhibited a tensile strength of 1900 lbs. per square inch at 110 percent elongation. It exhibited a volume increase of about one percent and a tensile strength of 1735 lbs. per square inch at 125 percent elongation after 70 hours immersion in Plexol 201 (a diester fluid) at 350 degrees Fahrenheit, and a tensile strength of 1150 lbs. per square inch at 110 percent elongation after aging in air for 168 hours at 400 degrees Fahrenheit.

EXAMPLE 60

A mixture containing 0.25 mole terephthalyl chloride, 0.75 mole adipyl chloride, and 1.00 mole 2,2,3,3,4,4-hexafluoropentane diol was reacted as in Example 6 until the linear polyester had a number average molecular weight of about 23,600, as determined by melt viscosity measurements. When this gum was compounded with 50 parts Furnex and 20 parts Purecal U, and cured in the manner illustrated in Example 58, using 19 parts Di-Cup 40C, the vulcanized elastomer exhibited tensile strength of 2140 lbs. per square inch at 125 percent elongation. It exhibited a negligible volume change and a tensile strength of 1985 lbs. per square inch at 175 percent elongation after aging in Plexol 201 at 350 degrees Fahrenheit for 70 hours, and a tensile strength of 1590 lbs. per square inch at 125 percent elongation after aging in air for 168 hours at 400 degrees Fahrenheit.

Many variations of the present invention may be practiced by those skilled in the art without departing from the spirit or scope thereof except as limited by the appended claims.

We claim:

1. A linear polyester having a number average molecular weight of at least 3,000 and comprised of the reaction product of (1) a dicarboxylic compound having a formula selected from the group consisting of:

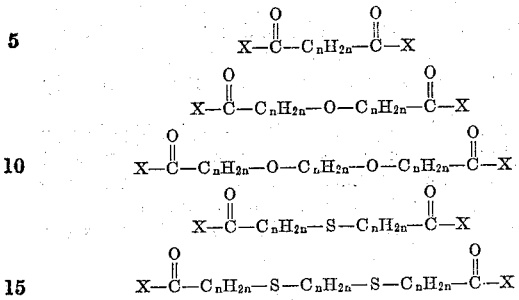

and mixtures thereof, wherein X is selected from the group consisting of hydroxy, chloro-, lower alkoxy, and anhydro-; and wherein $n$ is an integer from 0 to 10; and (2) a fluorine-containing diol having the general formula:

$$HOCH_2-C_nF_{2n}-CH_2OH$$

wherein $n$ is an integer from one to four.

2. A linear polyester according to claim 1 wherein said diol is 2,2,3,3,4,4-hexafluoropentanediol.

3. A linear polyester according to claim 1 wherein said diol is 2,2,3,3,4,4,5,5-octafluorohexanediol.

4. A linear polyester according to claim 2 wherein said dicarboxylic compound is glutaryl chloride.

5. A linear polyester according to claim 2 wherein said dicarboxylic compound is adipyl chloride.

6. A linear polyester according to claim 3 wherein said dicarboxylic compound is glutaryl chloride.

7. A linear polyester according to claim 3 wherein said dicarboxylic compound is adipyl chloride.

8. A linear polyester according to claim 1 wherein there is additionally contained a polycarboxylic compound containing aliphatic carbon-to-carbon unsaturation in an amount up to 30 mole percent based on the acid part of said polyester.

9. A linear polyester according to claim 1 wherein there is additionally contained a chain extending agent selected from the group consisting of polyisocyanates, polyepoxides, diamines, dicarboxylic acids, polyketenes, polyacid chlorides, anhydrides and polyanhydrides.

10. A linear polyester according to claim 1 wherein the molar ratio of the dicarboxylic compound to said diol is approximately unity.

11. A linear polyester according to claim 1 wherein the dicarboxylic compound is comprised of a mixture of dicarboxylic compounds, including one which has a formula selected from the group consisting of:

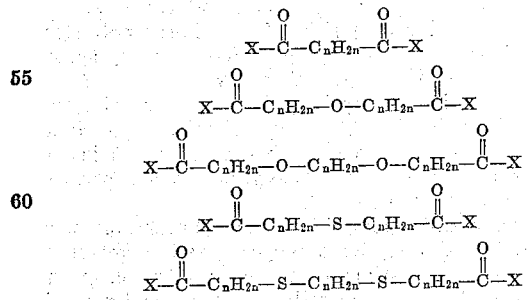

wherein X is selected from the group consisting of hydroxy, chloro-, lower alkoxy, and anhydro-; and wherein $n$ is an integer from 0 to 10 in an amount of at least 70 mole percent and a dicarboxylic compound containing aliphatic carbon-to-carbon unsaturation present in an amount up to 30 mole percent based on the acid part of said polyester; and wherein the molar ratio of the total carboxylic compounds to the diol is approximately unity.

12. A linear polyester according to claim 1 containing 2,2,3,3,4,4-hexafluoropentanediol and 2,2,3,3,4,4,5,5-octafluorohexanediol, and wherein the molar ratio of said dicarboxylic compound to said diols is approximately unity.

13. A linear polyester according to claim 11 containing 2,2,3,3,4,4-hexafluoropentanediol and 2,2,3,3,4,4,5,5-octafluorohexanediol and wherein the molar ratio of said dicarboxylic compounds to said diols is approximately unity.

14. A process for the preparation of a linear polyester having a number average molecular weight of at least 3,000 which comprises reacting at an elevated temperature a mixture comprised of (1) a dicarboxylic compound having a formula selected from the group consisting of:

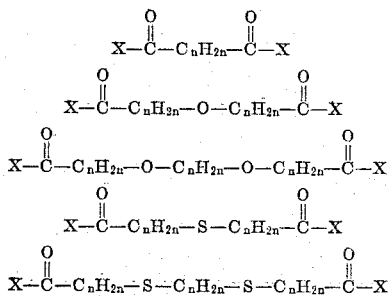

and mixtures thereof, wherein X is selected from the group consisting of hydroxy, chloro-, lower alkoxy, and anhydro-, and wherein $n$ is an integer from 0 to 10; and (2) a fluorine-containing diol having the general formula:

$$HOCH_2\text{—}C_nF_{2n}\text{—}CH_2OH$$

wherein $n$ is an integer from one to four.

15. A process according to claim 14 when carried out in the presence of a liquid which is inert to materials 1 and 2, stable at the reaction temperatures employed, and which is easily removable at the completion of the polyesterification reaction.

16. A composition comprising (A) a linear polyester as defined in claim 1 and (B) a cross-linking agent therefor.

17. A composition according to claim 16 wherein said cross-linking agent is selected from the group consisting of free-radical polymerization catalysts, polyisocyanates and polyepoxides.

18. A composition according to claim 16 when containing additionally admixed a reinforcing filler.

19. A composition according to claim 18 wherein the additionally admixed filler contains carbon black.

20. A composition comprising (A) a linear polyester as defined in claim 1, (B) a polyisocyanate extending agent and (C) a cross-linking agent therefor.

21. A composition comprising (A) a linear polyester as defined in claim 1, (B) a polyepoxide extending agent and (C) a cross-linking agent therefor.

22. A composition comprising (A) a linear polyester as defined in claim 1, (B) a polycarboxylic compound containing aliphatic carbon-to-carbon unsaturation in an amount up to 30 mole percent based on the acid part of said polyester, and (C) a cross-linking agent therefor.

23. A composition comprising (A) a linear polyester as defined in claim 1, (B) a polycarboxylic compound containing aliphatic carbon-to-carbon unsaturation in an amount up to 30 mole percent based on the acid part of said polyester, (C) a chain extending agent selected from the group consisting of polyisocyanates, polyepoxides, diamines, dicarboxylic acids, polyketenes, polyacid chlorides, anhydrides and polyanhydrides and (D) a cross-linking agent therefor.

24. A composition comprised of (A) a mixture of dicarboxylic compounds, including one which has a formula selected from the group consisting of:

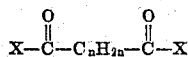

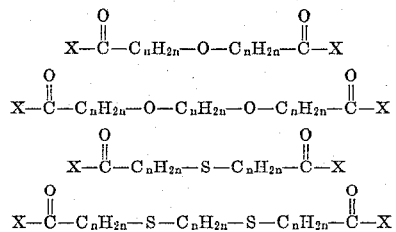

wherein X is selected from the group consisting of hydroxy, chloro-, lower alkoxy, and anhydro-, and wherein $n$ is an integer from 0 to 10 present in an amount of at least 70 mole percent and a dicarboxylic compound containing aliphatic carbon-to-carbon unsaturation present in an amount up to 30 mole percent based on the acid part of said polyester; and (B) a fluorine-containing diol having the following formula:

$$HOCH_2\text{—}C_nF_{2n}\text{—}CH_2OH$$

wherein $n$ is an integer from one to four, and (C) a cross linking agent therefor.

25. A composition according to claim 24 when containing additionally admixed a reinforcing filler.

26. An elastomer produced by reacting at an elevated temperature the composition defined in claim 16.

27. An elastomer produced by reacting at an elevated temperature the composition defined in claim 18.

28. An elastomer produced by reacting at an elevated temperature the composition defined in claim 20.

29. An elastomer produced by reacting at an elevated temperature the composition defined in claim 21.

30. An elastomer produced by reacting at an elevated temperature the composition defined in claim 22.

31. An elastomer produced by reacting at an elevated temperature the composition defined in claim 23.

32. An elastomer produced by reacting at an elevated temperature the composition defined in claim 24.

33. An elastomer produced by reacting at an elevated temperature the composition defined in claim 25.

34. A process for the production of a fluorine-containing elastomer which comprises (A) reacting together a dicarboxylic compound having a formula selected from the group consisting of:

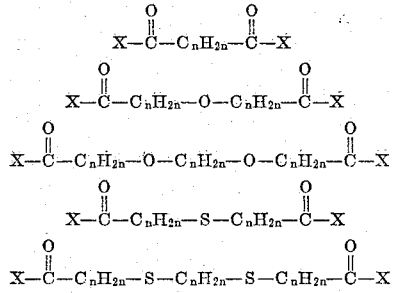

and mixtures thereof, wherein X is selected from the group consisting of hydroxy, chloro-, lower alkoxy, and anhydro-; and wherein $n$ is an integer from 0 to 10; and (2) a fluorine containing diol having the general formula:

$$HOCH_2\text{—}C_nF_{2n}\text{—}CH_2OH$$

wherein $n$ is an integer from one to four, to produce a linear polyester, (B) mixing the linear polyester thus formed together with a cross-linking agent therefor, and (C) reacting the mixture at vulcanizing temperature.

References Cited in the file of this patent

UNITED STATES PATENTS

| | | |
|---|---|---|
| 2,441,799 | D'Alelio | May 18, 1948 |
| 2,697,087 | Hetzel | Dec. 14, 1954 |
| 2,783,215 | Robitschek | Feb. 26, 1957 |
| 2,902,473 | Smith | Sept. 1, 1959 |

OTHER REFERENCES

McBee: "Jour. Am. Chem. Soc.," 74 (1952), 444.